US006805007B2

United States Patent
Fell et al.

(10) Patent No.: US 6,805,007 B2
(45) Date of Patent: Oct. 19, 2004

(54) VIBRATORY SENSOR OPERATING AS A RATE GYRO ABOUT TWO AXES AND AS A RATE INTEGRATING GYRO ABOUT THE THIRD ONE

(75) Inventors: Christopher P Fell, Plymouth (GB); Kevin Townsend, Liskeard (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/181,765

(22) PCT Filed: Jan. 8, 2001

(86) PCT No.: PCT/GB01/00057

§ 371 (c)(1),
(2), (4) Date: Jul. 23, 2002

(87) PCT Pub. No.: WO01/53776

PCT Pub. Date: Jul. 26, 2001

(65) Prior Publication Data

US 2003/0056588 A1 Mar. 27, 2003

(30) Foreign Application Priority Data

Jan. 20, 2000 (GB) ............................................. 0001294

(51) Int. Cl.[7] ............................................. G01C 19/00
(52) U.S. Cl. ................................ 73/504.12; 73/504.13
(58) Field of Search ......................... 73/504.13, 504.02, 73/504.04, 504.12, 504.14, 504.15, 504.16

(56) References Cited

U.S. PATENT DOCUMENTS

| 4,793,195 | A | | 12/1988 | Koning | |
|---|---|---|---|---|---|
| 5,074,159 | A | | 12/1991 | Wizman et al. | |
| 5,218,867 | A | * | 6/1993 | Varnham et al. | 73/504.13 |
| 5,419,194 | A | * | 5/1995 | Varnham et al. | 73/504.13 |
| 5,616,864 | A | * | 4/1997 | Johnson et al. | 73/504.04 |
| 6,282,958 | B1 | * | 9/2001 | Fell et al. | 73/504.13 |
| 6,343,509 | B1 | * | 2/2002 | Fell et al. | 73/504.13 |
| 6,401,534 | B1 | * | 6/2002 | Fell et al. | 73/504.13 |

FOREIGN PATENT DOCUMENTS

| EP | 0 609 929 | 8/1994 |
|---|---|---|
| GB | 2 318 184 A | 4/1998 |
| GB | 2 335 273 | 9/1999 |
| WO | 93 05400 A | 3/1993 |

* cited by examiner

*Primary Examiner*—Helen Kwok
(74) *Attorney, Agent, or Firm*—Nixon & Vanderhye P.C.

(57) ABSTRACT

A vibrating structure gyroscope comprises a resonant body, a drive transducer for driving resonant motion of the body, a pick-off for producing signals representative of the resonant motion, and a signal processor for extracting z-axis orientation information and x- and y-axis rate information from the signals. The resonant body is planar and the resonant motion takes place in a vibration mode pattern whose orientation angle with respect to the body varies in accordance with z-axis orientation of the body and couples energy into an out-of-plane response mode motion in accordance with rotation of the body about the x- or y-axis. The signal processor resolves the out-of-plane response mode motion with reference to a z-axis orientation signal to extract the x- and y-axis rate information.

15 Claims, 5 Drawing Sheets

Fig.1a. *(Prior Art)*
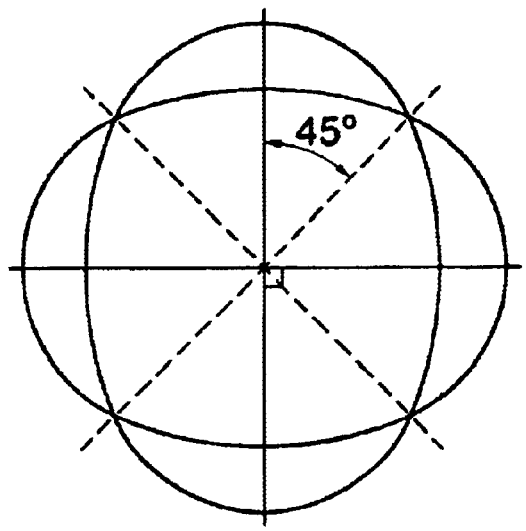
Fig.1b. *(Prior Art)*
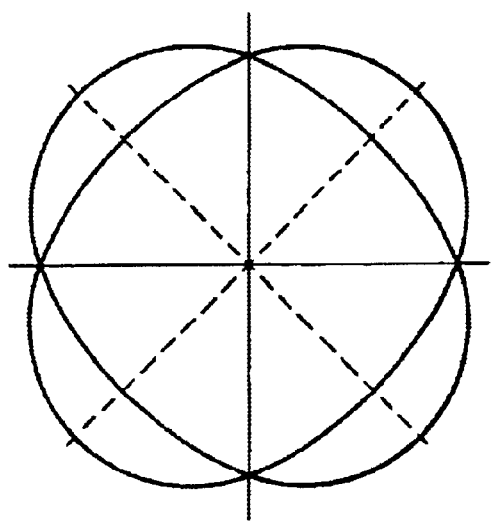

VIBRATORY SENSOR OPERATING AS A RATE GYRO ABOUT TWO AXES AND AS A RATE INTEGRATING GYRO ABOUT THE THIRD ONE

This application is the US national phase of international application PCT/GB01/00057 filed 08 JAN. 2001, which designates the US.

BACKGROUND OF THE INVENTION

1. Field of the Invention

This invention relates to multi-axis sensing devices and more particularly to vibrating structure gyroscopes that employ a resonant element.

2. Discussion of Prior Art

Vibrating structure gyroscopes have been fabricated using a variety of structures for the resonant element including beams tuning forks, cylinders and rings. Aside from measurement of the rate of rotation about a particular axis, these devices are also capable of operation in "whole angle" or "gyroscope" mode in which the device output gives a direct measure of the angle of rotation about a particular axis, as described in U.S. Pat. No. 5,218,867. This mode of operation is known to give advantages in terms of improved scalefactor performance, particularly in applications where the device is subjected to sustained high rates of rotation.

Planar rings have been shown to be particularly versatile, with single-axis rate zero variants being commercially available using both conventionally fabricated and micromachined resonators.

Conventional single-axis planar ring gyroscopes typically use cos 2θ in-plane vibration mode pairs. For a perfectly symmetric resonator there will be two degenerate modes at a mutual angle of 45°. These are shown schematically in FIG. 1a (cos 2θ mode) and FIG. 1b (sin 2θ mode) which show the ring distortion at the two extremes of motion during a single vibration cycle. One of these modes is excited as the carrier mode (FIG. 1a). When the structure is rotated about the axis normal to the plane of the ring (the z-axis). Coriolis forces couple energy into the response mode (FIG. 1b). The Coriolis force, and hence the amplitude of the response mode motion is directly proportional to the applied rotation rate. Other higher-order cos nθ mode pairs may also be used in similar fashion.

In operation, the carrier mode is driven at the resonance maximum and is typically maintained at a constant amplitude. The Coriolis forces generated as a result of rotation will be at the carrier resonance frequency. The response mode frequency is typically matched to that of the carrier and thus the motion arising as a result of these forces is amplified by the Q (quality factor) of the structure, giving enhanced sensitivity. This response mode motion may be nulled using a force feedback loop with the nulling force then being directly proportional to the applied rate. This mode of operation removes the Q dependence from the rate output and gives improved scalefactor performance. The motion of the ring is thus maintained at a fixed angular orientation at all times.

Planar ring structures are also suitable for use in single-axis attitude sensors using in-plane cos nθ mode pairs, such as described in relation to a cylindrical element in U.S. Pat. No. 5,218,867. In this mode of operation, the vibration energy is free to transfer between the in-plane mode pairs as the device is rotated, with no force feedback being applied. If the mode frequencies are accurately matched, this will be equivalent to the mode rotating around the ring as the structure is rotated. The mode pattern orientation is not inertially stable but tends to lag behind the rotation of the ring structure. The ratio of the pattern angle rotation to the applied rotation angle is given by an inertial coupling constant, K, which is dependent upon the resonator structure and the mode order, n.

When operating in this mode, the same drive and pick-off configurations may be employed as for conventional closed-loop rate gyro operation. The techniques for detecting the mode orientation on the ring and for maintaining the amplitude of motion are, however, significantly different. A radial drive signal is applied to sustain the vibration amplitude at one or more of the radial anti-nodes. As the mode pattern rotates around the ring, the effective drive position is required to track the radial anti-node around the ring. The pick-offs must similarly have the capability of resolving the actual radial motion of the ring at both the radial anti-node and node. The radial anti-node signal is used to maintain the drive frequency at the resonance maximum and to normalise the vibration amplitude. The radial node signal is required to track the mode position accurately.

Ring structures are also capable of providing rate sensitivity around multiple axes, as described in UK Patent Application Nos. 2318184A and 2335273A. When driven in a cos nθ in-plane carrier mode, rotations about axes in the plane of the ring will also give rise to Coriolis forces. These forces will be along the axis normal to the plane of the ring (z-axis). For rotation around the y-axis $\Omega_y$, where the y-axis is taken to be along θ=0°, these Coriolis forces, $F_z(\theta)$, will have an angular distribution given by:

$$F_z(\theta) = F_{n+1}\Omega_y \sin(n+1)\theta + F_{n-1}\Omega_y \sin(n-1)\theta$$

where θ is the angular position around the ring with respect to a fixed reference position, n is the carrier mode order and the parameters $F_{-1}$ and $F_{n+1}$ are constants which depend on the precise geometry of the ring, the material from which the ring is made, and the value of n. Similarly, for rotation about the x-axis, $\Omega_x$, the Coriolis forces will have an angular distribution given by:

$$F_z(\theta) = F_{n-1}\Omega_x \cos(n+1)\theta - F_{n-1}\Omega_x \cos(n-1)\theta$$

These forces thus have components that are capable of directly exciting either the sin(n−1)θ and cos(n+1)θ or the sin(n−1)θ and cos(n−1)θ out-of-plane mode pairs. The rin dimensions may be set such that the resonant frequency of one of the mode pairs exactly matches that of the in-plane carrier mode. In this way, the amplitude of the out-of-plane response motion will be amplified by the Q of the structure as for the in-plane response.

Using such designs, a single device can provide all the functionality required for navigation applications where previously two or three single-axis devices would be needed, one device being dedicated to each axis. Multi-axis devices have the advantage that the mutual alignment of the sensing axes is set during the resonator fabrication process, and yet single-frequency operation for all axes means that the electronics need not be significantly more complex than in a single-axis device. For applications requiring rate sensitivity around multiple axes, such a multi-axis device may provide a significant reduction in both cost and size.

Between them, UK Patent Application Nos. 2318184A and 2335273A describe various modal combinations that may be employed to implement both two- and three-axis rate gyroscopes. The locations of the drive and pick-off transducer elements appropriate for each combination are also shown therein.

The disclosures of U.S. Pat. No. 5,218,867 and UK Patent Application Nos. 2318184A and 2335273A are incorporated herein by reference.

Certain gyroscope applications may require measurement of the spatial orientation of a body that is subject to high rates of rotation about one particular axis. In aircraft navigation, for example, the roll axis of the aircraft may be subject to higher rotation rates than the pitch and yaw axes. In order to compute the orientation in the pitch and yaw axes in such applications, it is essential that the orientation in the roll axis is known to a high degree of accuracy.

Consequently, for axes experiencing high rotation rates, there is a considerable performance advantage in operating in "whole angle" mode to prevent the accumulation of a heading error due to scalefactor error. By way of illustration, a 1% scalefactor error will result in a 3.6° heading error for each revolution. This problem of cumulative error is particularly acute when sensing the motion of a wheel or axle, in which one axis will obviously experience vastly higher rotation rates than the other two axes.

There is therefore a requirement for a device that combines the advantages of multi-axis operation whilst providing for accurate measurement of orientation around a single axis that may be subject to sustained high rates of rotation.

SUMMARY OF THE INVENTION

The present invention results from the insight that it is possible to operate the z-axis response of a multi-axis gyroscope in "whole angle" or "gyroscope" mode whilst retaining the x- and y-axis responses in rate gyro mode. Accordingly, the invention may be expressed broadly as a three-axis gyroscopic sensing device adapted for operation as a rate gyroscope about two axes and as a whole angle gyroscope about the third axis.

The invention therefore resides in a vibrating structure gyroscope comprising a resonant body, drive transducer means for driving resonant motion of the body, pick-off means for producing signals representative of the resonant motion, and signal processing means for extracting z-axis orientation information and x- and y-axis rate information from the signals, such that the gyroscope operates as a whole angle gyroscope for rotations about the z-axis and as a rate angle gyroscope for rotations about the x-axis and y axis.

More specifically, the signal processing means extracts z-axis carrier mode orientation information from the signals and normalises this information to give information on the angular orientation about the z-axis, as well as extracting x- and y-axis rate information from the signals.

In such a gyroscope the resonant body is typically a planar ring structure and the resonant motion takes place in a vibration mode pattern in the plane of the ring whose orientation angle with respect to the body varies proportionately with the orientation of the body about its z-axis. This vibration mode pattern couples energy into an out-of-plane response mode motion in accordance with rotation of the body about the x- or y-axis. In this case, the signal processing means advantageously resolves the out-of-plane response mode motion with reference to a z-axis orientation signal representative of the orientation about the z-axis to extract the x- and y-axis rate information.

The pick-off means suitably comprises a first plurality of pick-offs positioned to sense resonant motion in the plane of the body and a second plurality of pick-offs positioned to sense response mode motion out of the plane of the body. The pick-offs of the second plurality should be separated by 30 k°, where k is an odd integer.

The drive transducer means preferably comprises a plurality of drive transducers driven via a drive resolver that takes input from the z-axis carrier vibration mode orientation signal to give a resultant drive resolved along the orientation angle of the vibration mode pattern.

In preferred embodiments of the invention, the signal processing means includes rate integration means that takes input signals from the first plurality of in-plane pick-offs via a pick-off resolver and outputs the z-axis orientation signal, and an x- y-axis resolver that takes as input drive signals applied to a plurality of out-of-plane drives, resolves those signals with reference to the z-axis carrier vibration mode orientation signal, and outputs the x- and y-axis rate information.

Advantageously, an anti-nodal signal from the pick-off resolver is applied to a phase locked loop that adjusts the drive frequency of the drive transducer means to track a resonance maximum. The anti-nodal signal is preferably also applied to a gain control loop that adjusts the drive level applied to the drive transducer means to maintain a constant anti-nodal signal.

A nodal signal from the pick-off resolver may be applied to a rate integration means that preferably comprises a phase detector to resolve any signal component that is in-phase with an anti-nodal signal. The rate integration means advantageously comprises a rate signal generator means such as a loop controller that takes the nodal signal and outputs a rate signal proportional to the rate of rotation of the vibration mode pattern about the z-axis. The rate integration means can then further comprise an integrator that integrates the rate signal to output the z-axis carrier vibration mode orientation signal. This z-axis carrier vibration mode orientation signal can be applied to a normalising means that applies the Bryan factor to that signal to give a direct measure of the angle through which the gyroscope body has rotated around the z-axis.

Conveniently, the pick-off means comprises an x-axis pick-off whose output is applied to an x-axis rate loop and a y-axis pick-off whose output is applied to a y-axis rate loop and the x- and y-axis rate loops respectively apply drive signals to x- and y-axis drive transducers to null the signal at the respective pick-offs.

To minimise vibration pattern drift, it is advantageous to employ a quadrature nulling loop. This loop preferably applies a drive signal to the drive transducer means along a nodal axis to maintain the input to the loop at zero.

BRIEF DESCRIPTION OF THE DRAWINGS

For a better understanding of the present invention and to show how it may be carried into effect, reference will now be made, by way of example, to the remaining drawings in which:

FIG. 1a shows diagrammatically a degenerate cos 2θ vibration mode in a symmetric resonator or vibrating structure acting as a carrier mode in a conventional manner, FIG. 1b is a diagrammatic illustration of a degenerate sin 2θ vibration mode at 45° to that FIG. 1a, acting as a response mode in a conventional manner.

DETAILED DESCRIPTION OF EMBODIMENTS

To recap, the present invention contemplates a multi-axis sensing device that operates as a rate gyroscope about two axes, x and y, and as a "whole angle" gyroscope about the third axis, z. With the z-axis gyroscope response implemented in this mode, the carrier mode for the x- and y-axis rate responses is no longer spatially fixed on the ring. A rotation applied around the z-axis will therefore result in the in-plane carrier mode angular position rotating around the ring.

The carrier mode shape may be defined with respect to a fixed angular reference direction. θ=0°, which is taken to be along a diameter passing through the ring centre. The radial displacement of the ring will have a cos n(θ+α) angular distribution, where α is the mode angular orientation with respect to the reference direction. The x and y rate response axes may also be defined with respect to the fixed gyroscope body reference axis, the y-axis lying along θ=0° and the x-axis lying along θ=90°.

In order to derive the Coriolis force components generated as a result of rotation around the x- and y-axes, it is necessary to consider the angular distribution of the radial and tangential velocity components of the carrier mode, for any given value of α. From this, the velocity components in the x and y directions can be calculated and hence the Coriolis force distributions arising from rotations around the x- and y-axes.

For a rotation around the x-axis, $\Omega_x$, the out-of-plane Coriolis force distribution. $F_z(\theta)$, will be given by:

$$F_z(\theta)=F_{n-1}\Omega_x \cos\{n\alpha+(n+1)\theta\}+F_{n-1}\Omega_x \cos\{n\alpha+(n-1)\theta\}$$

where as before, θ is the angular position around the ring with respect to the fixed reference position, n is the carrier mode order and the parameters $F_{n+1}$ and $F_{n-1}$ are constants that depend on the precise geometry of the ring, the material from which the ring is made, and the value of n. Similarly, for rotation around the y-axis, $\Omega_y$, the Coriolis force distribution will be given by:

$$F_z(\theta)=F_{n+1}\Omega_y \sin\{n\alpha+(n+1)\theta\}+F_{n-1}\Omega_y \sin\{n\alpha+(n-1)\theta\}$$

It will be apparent that these expressions are similar to those obtained for a fixed carrier mode position as previously discussed, except for the additional nα terms. Rotations around the body-fixed x and y axes will therefore still result in the generation of Coriolis force components that can couple directly into $\cos(n\pm1)\theta$ or the $\sin(n\pm1)\theta$ out-of-plane mode pairs. However, these force components will also be displaced by an angle nα on the ring.

Figure 2A:
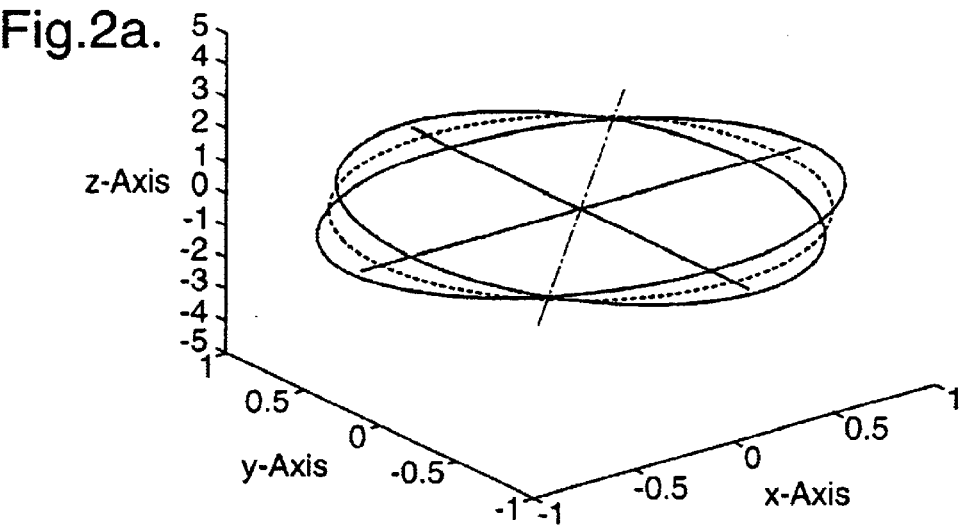
FIG. 2a is a three-dimensional representation showing the angular distribution of radial displacement for a cos 2(θ+α) in-plane carrier mode where α=0°.

These effects may be illustrated, by way of example, for a $\cos 2(\theta+\alpha)$ in-plane carrier mode coupling into $\cos(3\theta+2\alpha)$ and $\sin(3\theta+2\alpha)$ out-of-plane response modes. FIG. 2a shows a three-dimensional representation of the radial displacement angular distribution for a $\cos 2(\theta+\alpha)$ in-plane carrier mode for α=0°. The broken line shows the undisplaced position of the ring with the solid lines showing the extremes of motion during a single vibration cycle.

Figure 2B:
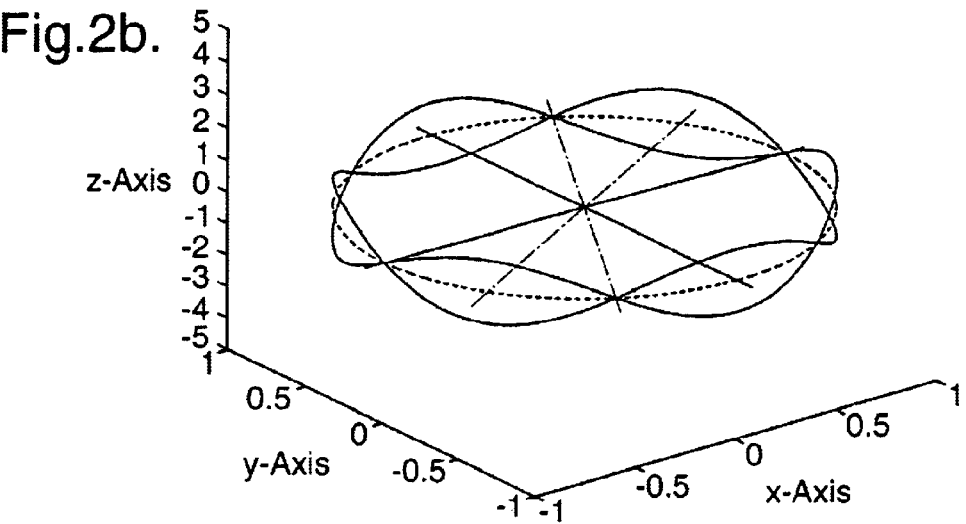
FIG. 2b corresponds to FIG. 2a but shows the cos 3θ vibration mode pattern of z-axis displacement excited by rotation around the x-axis.
Figure 2C:
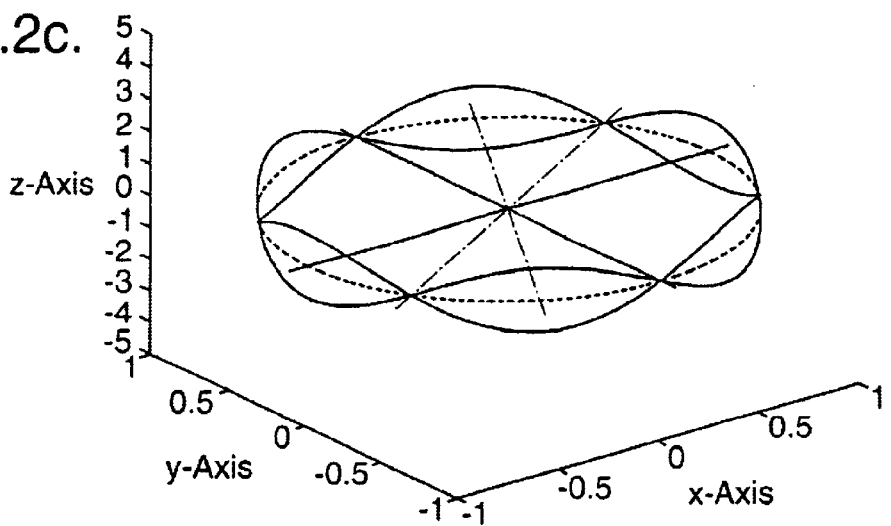
FIG. 2c corresponds to FIGS. 2a and 2b but shows the sin 3θ vibration mode pattern of z-axis displacement excited by rotation around the y-axis.

A rotation applied around the x-axis will generate Coriolis force components which will excite a vibration mode pattern with z-axis displacements as shown in FIG. 2b. Again, the solid lines show the extremes of out-of-plane displacement from the stationary ring (dashed line) during the vibration cycle. Similarly, rotation applied around the y-axis will excite a vibration mode pattern as shown in FIG. 2c.

Figure 3A:
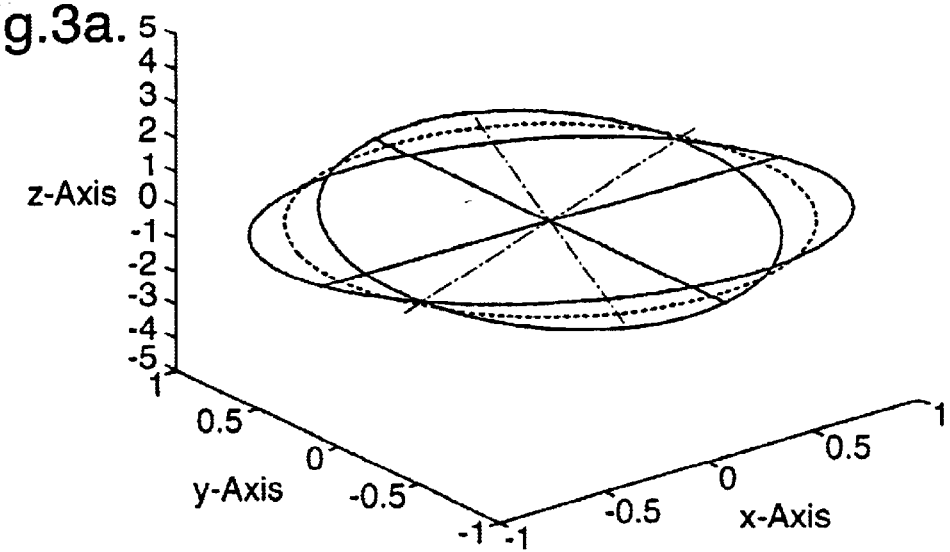
FIGS. 3a, 3b and 3c correspond respectively to FIGS. 2a, 2b and 2c but show the equivalent responses where α=22.5°.
Figure 3B:
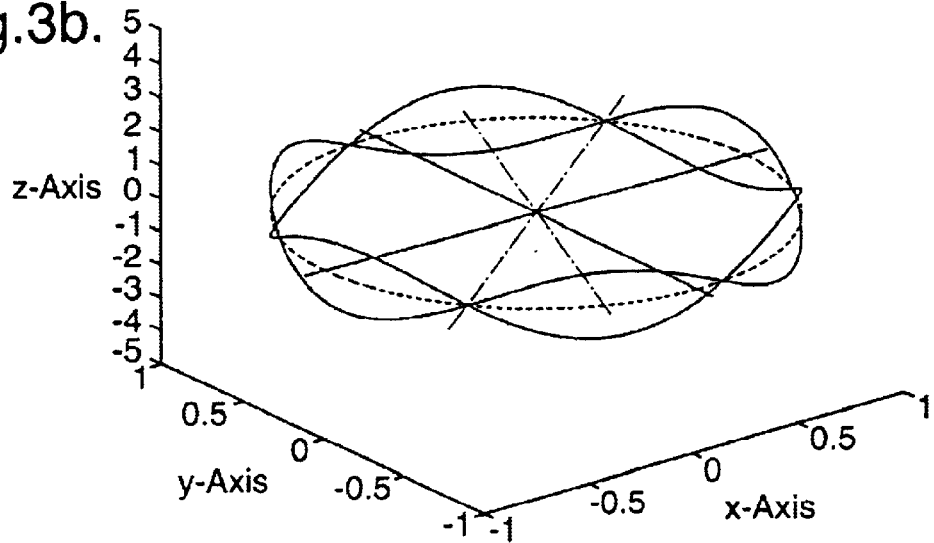
Figure 3C:
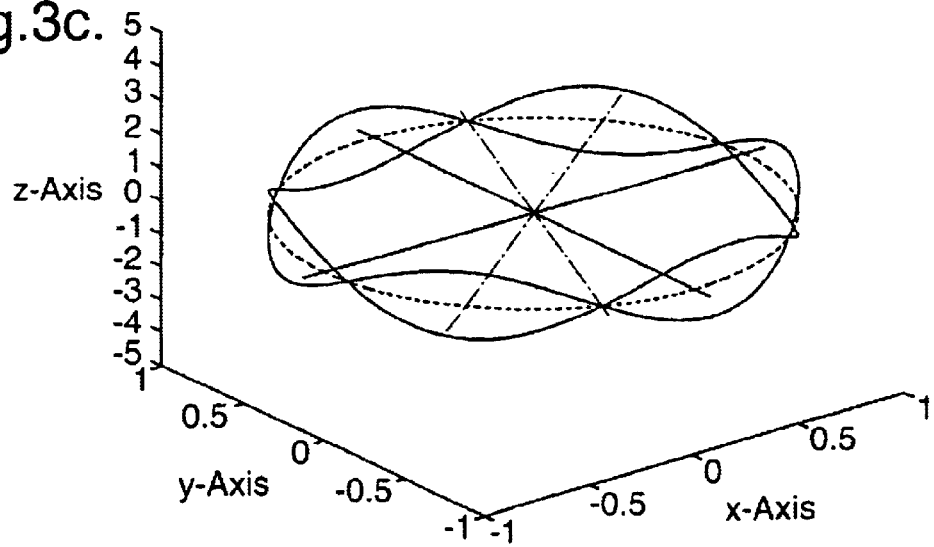

FIG. 3 shows the equivalent responses where α=22.5°. FIG. 3a shows the in-plane radial carrier mode displacement and FIGS. 3b and 3c show the out-of-plane response motion resulting from rotation applied around the x- and y-axes respectively. Similar plots may be generated for other modal combinations.

Using this combination of modes, it is necessary to resolve the $\cos(3\theta+2\alpha)$ out-of-plane response mode motion in order to measure rotation around the x-axis of the gyro body. Similarly, to measure rotation around the y-axis it is necessary to resolve the $\sin(3\theta+2\alpha)$ out-of-plane response mode motion. The amplitude of motion of these modes is conveniently measured at one or more of the vibration anti-nodes. As these anti-nodal points are no longer fixed on the ring, the x- and y-axis responses cannot be detected directly by fixed out-of-plane (z-axis) pick-off elements. The relevant motions can, however, be resolved in the required angular directions by combining the output of two or more appropriately located fixed pick-off elements. Where these response modes are operated in a force feedback mode, the appropriate drive forces may similarly be applied at the required resolved angular locations using two fixed drive transducers.

Figure 4:
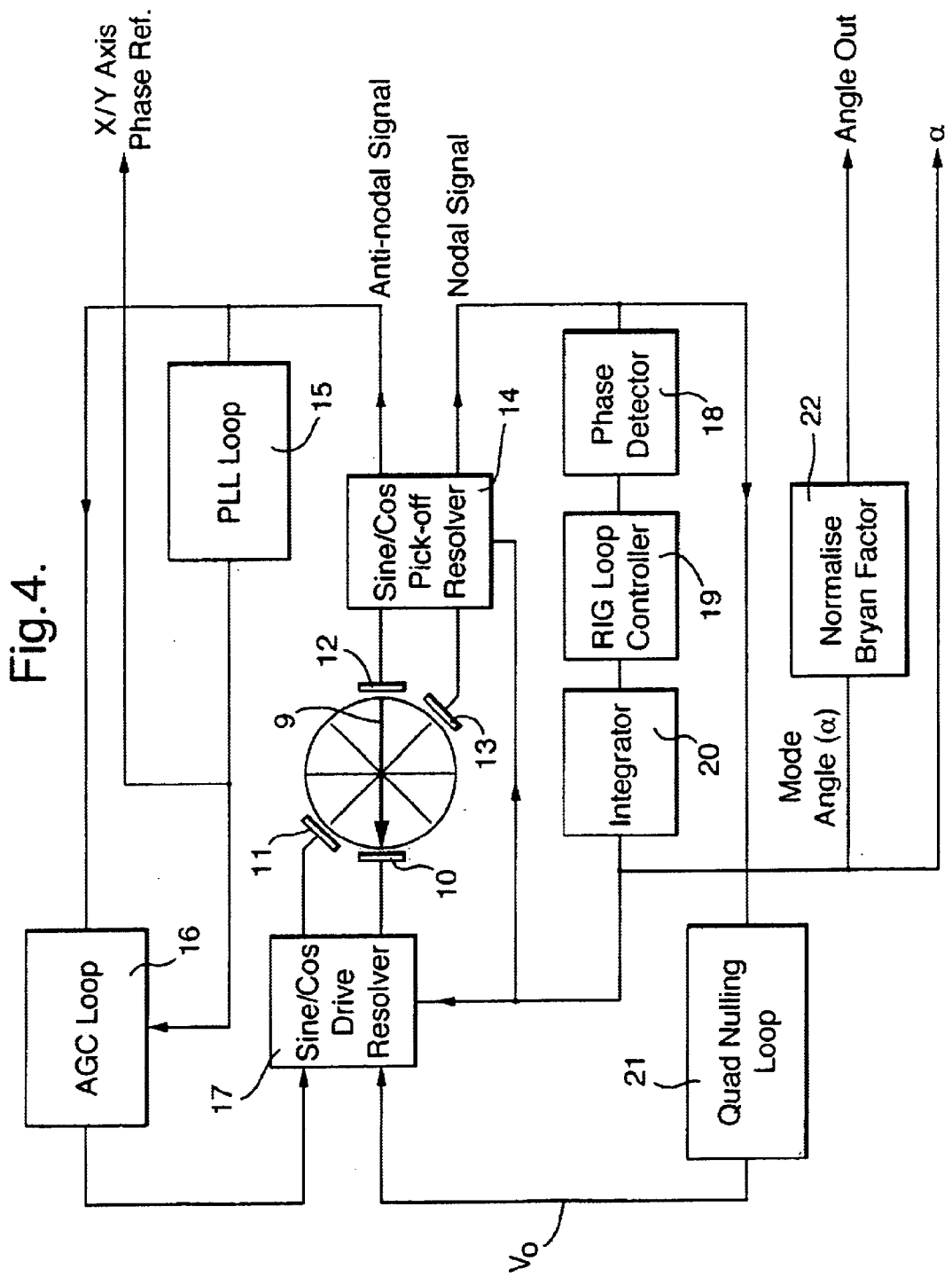
FIG. 4 is a block diagram of a preferred embodiment of the invention showing components that implement z-axis angle sensing.

The control circuit for the in-plane rate integrating vibration mode control is shown in FIG. 4. The 0° direction is indicated by the solid arrow 9. Two drive elements 10 and 11 are located at 0° and 45° and two pick-off elements 12 and 13 are located at 180° and 225°.

For a known value of α, the sine/cos pick-off resolver 14 processes the signals from pick-off elements 12 and 13 and outputs one signal resolved along the anti-nodal position and another signal resolved along the nodal position.

The anti-nodal signal is applied to a phase locked loop 15 which adjusts the drive frequency to track the resonance maximum. This signal is also applied to a gain control loop 16 which adjusts the drive level to maintain a constant signal and thus to stabilise the vibration amplitude. The drive signal $V_0$ is applied to the drive resolver element 17 which sets the drive levels on drive transducers 10 ($V_0\cos 2\alpha$) and 11 ($V_0\sin 2\alpha$) to give a resultant drive resolved along α.

The nodal pick-off signal is applied to a phase detector 18 that resolves the signal component which is in-phase with the anti-nodal signal. This signal is then applied to the RIG loop controller 19 to give a signal proportional to the rate of rotation of the vibration mode pattern. This output is applied to an integrator 20 to give a signal directly proportional to the vibration mode pattern orientation angle α. This value is applied to the sine/cos pick-off resolver 14 such that a null value is maintained at the phase detector 18 output. The orientation angle α is also applied to the sine/cos drive resolver 17 in order to maintain the resolved drive along the anti-nodal axis.

For a non-perfect resonator structure, a small difference in the sin 2θ and cos 2θ mode frequencies will give rise to a significant amount of quadrature motion at the radial nodal points. This is known to give rise to undesirable vibration pattern drift but may be eliminated by nulling the quadrature motion of the resonator by means of a quadrature nulling loop 21 as shown in FIG. 4. This resolves the component of the nodal signal that is in quadrature to the anti-nodal signal and applies a drive signal along a nodal axis such that the input to the quadrature nulling loop 21 is zero at all times.

The α value derived from the integrator 20, when normalised at 22 by the Bryan factor, gives a direct measure of the angle through which the gyroscope body has rotated around the z-axis.

Figure 5:
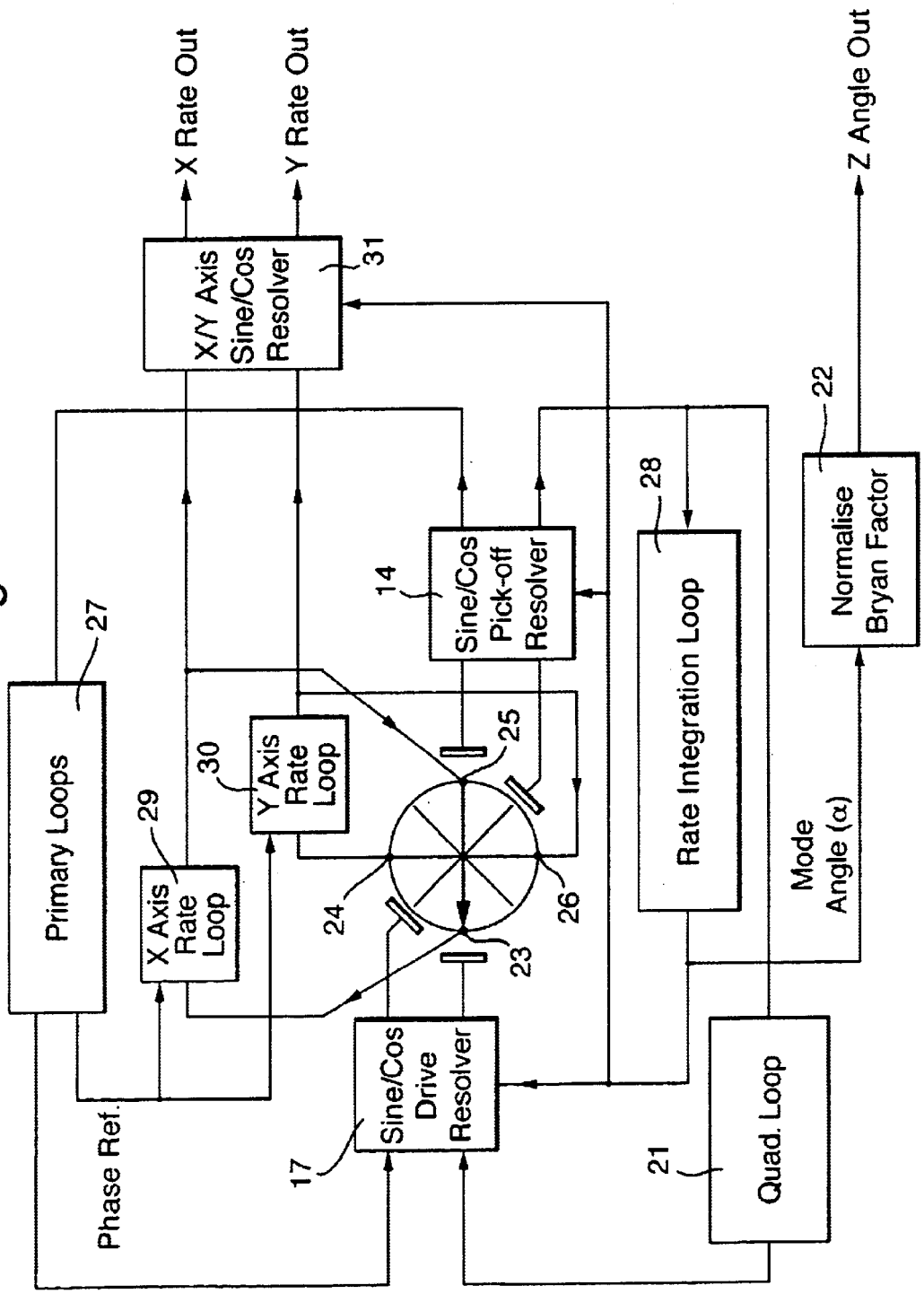
FIG. 5 is a block diagram corresponding to FIG. 4 but showing additional components that implement x- and y-axis rate sensing.

The implementation of the x- and y-axis rate sensing is shown schematically in FIG. 5. For the out-of-plane rate response modes it is convenient to use two pick-off elements 23 and 24 located at 0° and 90° with respect to the fixed reference axis although any two pick-off elements separated by 30 k° (where k is an odd integer) will be suitable. These pick-off elements are positioned appropriately above and/or below the ring rim to detect out-of-plane motion. Similarly, it is convenient to use two drive transducer elements 25 and 26 located at 180° and 270° to control the out-of-plane motion of the ring.

FIG. 5 shows the electronic control circuitry for the z-axis rate integrating mode discussed above in combination with x- and y-axis rate gyro operation. The primary loops 27 include both the phase locked 15 and gain control 16 loops illustrated in FIG. 4 for the in-plane carrier mode. Similarly, the rate integration loop 28 includes the phase detector 18, RIG loop controller 19 and integrator 20 of FIG. 4.

The output of x-axis pick-off 23 is applied to the x-axis rate loop 29 and a drive is applied to the x-axis drive element 25 in order to null the signal at the pick-off 23. Similarly, the output of y-axis pick-off 24 is applied to the y-axis rate loop 30 and a drive is applied to the y-axis drive element 26 in order to null the signal at the pick-off 24.

Where the in-plane and out-of-plane modes are all precisely matched in frequency, the out-of-plane response mode motion will be in phase with the in-plane motion but where any small frequency split is present, quadrature motion will be detected. Additional drive signals may be applied to the x- and y-axis drive elements 25 and 26 to null this quadrature motion in order to maintain a true null at the pick-off elements 23 and 24.

While the x- and y-axis drive and pick-off transducer elements 23, 24, 25, 26 are aligned along the input rotation axes, the responses to rate inputs about these axes are dependent upon the orientation of the carrier mode pattern, α. The applied rates must be resolved from these responses using the in-plane carrier mode angular location α. The drive signals from the x- and y-axis loops 29, 30 are applied to the sine/cos x-y axis resolver 31 and the in-phase drive levels are resolved along α (cos(3θ+2α) response) and α+30° (sin(3θ+2α) response) to obtain the x- and y-axis rate signals.

Many variations are possible within the inventive concept. For example, additional drive and pick-off elements may be located at additional angular locations matched to the modal symmetry of the vibrating element without changing the basic functionality of the device. More generally, the control scheme of the invention may be used with any of the in-plane carrier and out-of-plane response modal combinations described in UK Patent Application Nos. 2318184A and 2335273A.

Those skilled in the art will also know that that the resonator element could be made from various materials, such as electro-formed or micro-machined metal, quartz, polysilicon or bulk silicon. The choice of material will often be determined by the fabrication method and vice versa. It will also be apparent that the drive means and/or the pick-off means can operate using various principles, notably electrostatics, electromagnetics, piezoelectricity or optics.

What is claimed is:

1. A vibrating structure gyroscope comprising:
   a resonant body,
   drive transducer means for driving resonant motion of the body,
   pick-off means for producing signals representative of the resonant motion, and
   signal processing means for extracting z-axis carrier vibration mode orientation signal and for normalising said signal to give information on angular orientation about the z-axis and for extracting x- and y-axis rate information from the signals, wherein the gyroscope operates as a whole angle gyroscope for rotations about the z-axis and as a rate angle gyroscope for rotations about the x-axis and the y-axis.

2. The gyroscope of claim 1, wherein the resonant body is a planar ring structure and the resonant motion takes place in a vibration mode pattern in the plane of the ring structure whose orientation angle with respect to the body varies proportionately with the orientation of the body about the z-axis and couples energy into an out-of-plane response mode motion in accordance with rotation of the body about the x- or y-axis, and wherein the signal processing means resolves the out-of-plane response mode motion with reference to a z-axis orientation signal representative of orientation about the z-axis to extract the x- and y-axis rate information.

3. The gyroscope of claim 2, wherein the pick-off means comprises a first plurality of pick-offs positioned to sense resonant motion in the plane of the body and a second plurality of pick-offs positioned to sense response mode motion out of the plane of the body.

4. The gyroscope of claim 3, wherein the pick-offs of the second plurality are separated by 30k°, where k is an odd integer.

5. The gyroscope of claim 2, wherein the drive transducer means comprises a plurality of in-plane drive transducers driven via a drive resolver that takes input from the z-axis orientation signal to give a resultant drive resolved along the orientation angle of the vibration mode pattern.

6. The gyroscope of claim 3, wherein the signal processing means includes rate integration means that takes input signals from the first plurality of in-place pick-offs via a pick-off resolver and outputs the z-axis orientation signal, and an x- y-axis resolver that takes input drive signals applied to a plurality of out-of-plane drive transducers, resolves said drive signals with reference to the z-axis orientation signal, and outputs the x- and y-axis rate information.

7. The gyroscope of claim 6, wherein an anti-nodal signal from the pick-off resolver is applied to a phase locked loop that adjusts the drive frequency of the drive transducer means to a track a resonance maximum.

8. The gyroscope of claim 7, wherein the anti-nodal signal is applied to a gain control loop that adjusts the drive level applied to the drive transducer means to maintain a constant anti-nodal signal.

9. The gyroscope of claim 6, wherein a nodal signal from the pick-off resolver is applied to the rate integration means.

10. The gyroscope of claim 9, wherein the rate integration means comprises a phase detector that resolves the signal component which is in-phase with an anti-nodal signal.

11. The gyroscope of claim 9, wherein the rate integration means comprises a rate signal generator means that takes the nodal signal and outputs a rate signal proportional to the rate of rotation of the vibration mode pattern about the z-axis.

12. The gyroscope of claim 11, wherein the rate integration means further comprises an integrator that integrates the rate signal to output the z-axis orientation signal.

13. The gyroscope of claim 2, wherein the z-axis orientation signal is applied to a normalising means that applies the Bryan factor to the z-axis orientation signal to give a direct measure of the angle through which the body has rotated around the z-axis.

14. The gyroscope of claim 1, wherein the pick-off means comprises an x-axis pick-off whose output is applied to a y-axis rate loop, and the x- and y-axis pick-off whose output is applied to y-axis rate loop, and the x- and y-axis rate loops respectively apply drive signals to x- and y-axis drive transducers to null respective pick-off signals.

15. The gyroscope of claim 1, wherein a quadrature nulling loop applies a drive signal to the drive transducer means along a nodal axis to maintain the input to the quadrature nulling loop at zero.

* * * * *